UNITED STATES PATENT OFFICE.

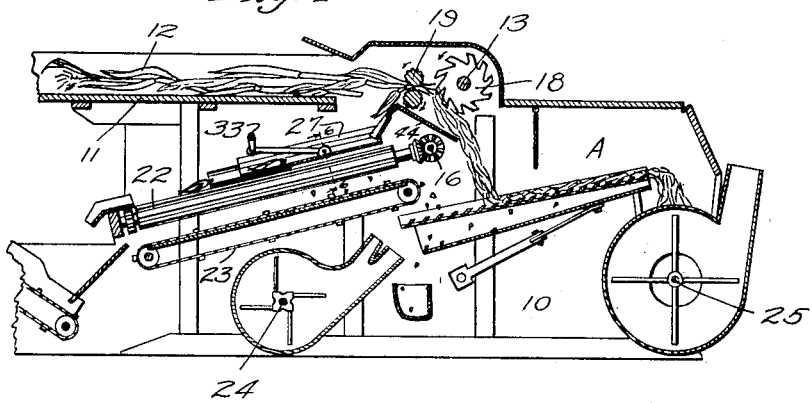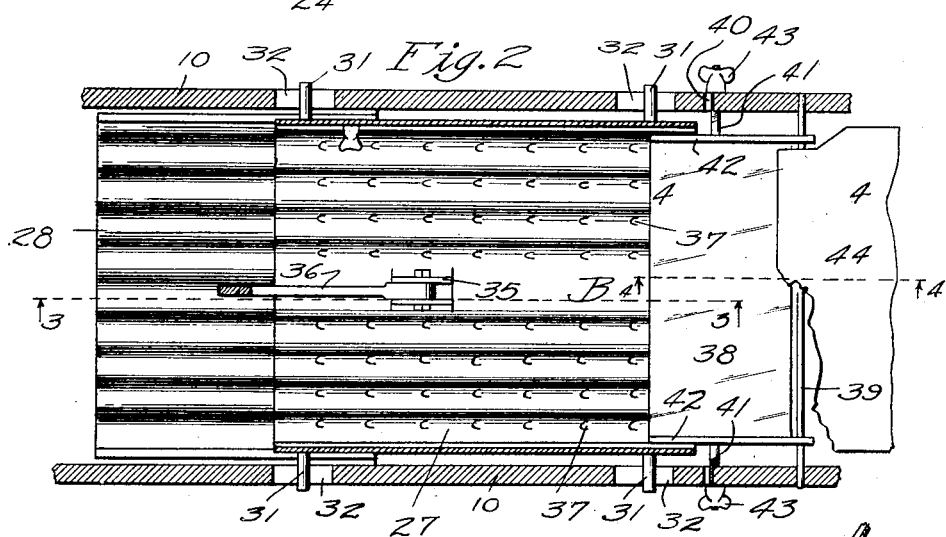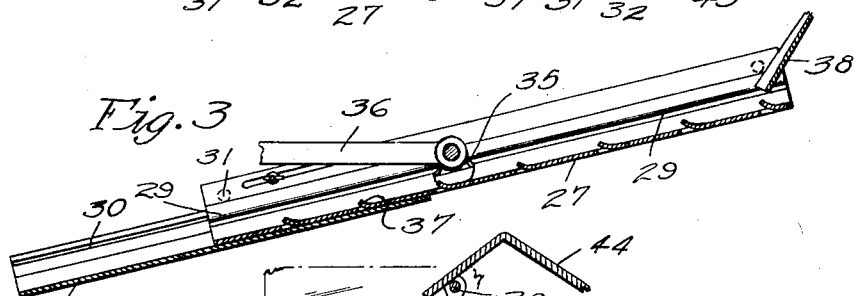

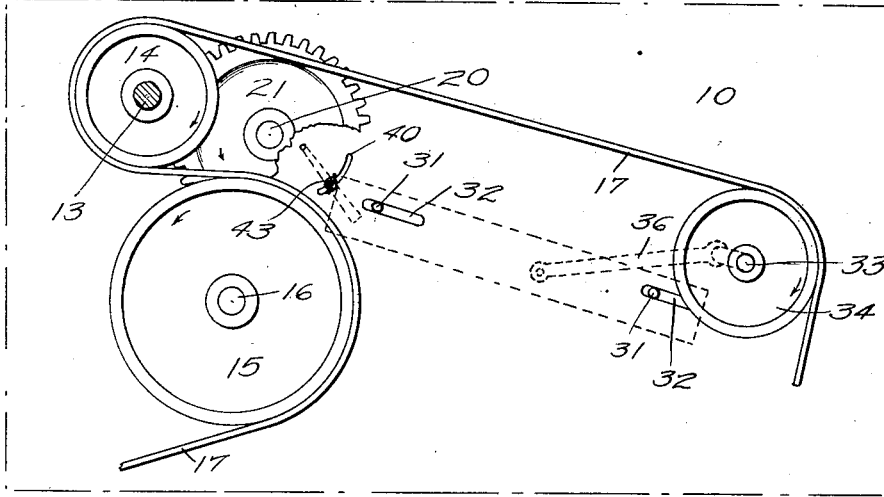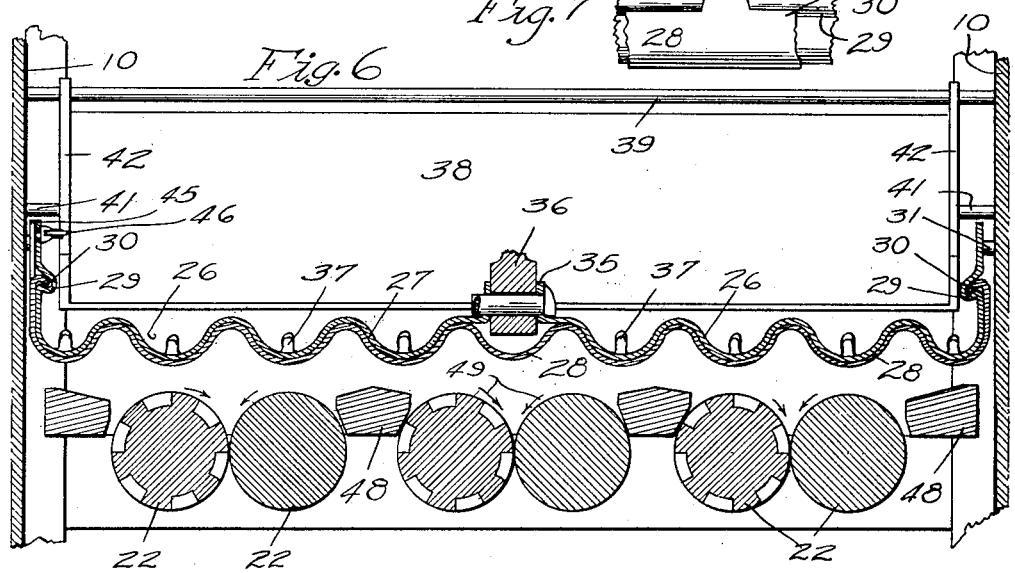

JOHN H. SISSEL, OF MASONVILLE, IOWA.

POPCORN-HUSKING DEVICE.

1,386,207.　　　　Specification of Letters Patent.　　Patented Aug. 2, 1921.

Application filed September 30, 1920. Serial No. 413,688.

*To all whom it may concern:*

Be it known that I, JOHN H. SISSEL, a citizen of the United States, and a resident of Masonville, in the county of Buchanan and State of Iowa, have invented a certain new and useful Popcorn-Husking Device, of which the following is a specification.

The object of my invention is to provide a machine especially adapted for husking or harvesting pop corn, which is of simple, durable and comparatively inexpensive construction.

More particularly it is my object to provide in such a machine mechanism for delivering the pop corn ears from the snapping rolls to the husking rolls in such position that the pop corn ears will be substantially parallel with the husking rolls.

It will be understood that ordinarily when the pop corn is being harvested or husked, the ears are only semi-cured and comparatively soft. Thus when the ears are snapped from the stalk and dropped on to the husking rolls the ear drops point downward, the result being that the ear which is soft and small is crushed between the husking rolls, rather than slid longitudinally thereon for stripping the husks from the ear.

My device is especially designed to convey or deliver ears of pop corn from the snapping rolls to the husking rolls so that the ear will be placed on the husking rolls in such position that it will be substantially parallel with the husking rolls, whereby the possibility of one end of the ear of corn from being received between the husking rolls and crushed thereby will be substantially eliminated.

Still a further object is to take the ears of pop corn when they are snapped from the stalk and aline or guide them on to the husking rolls.

Still a further object is to provide in such a device mechanism for placing the ears of pop corn on to the husking rolls under force.

Still a further object is to provide a riddle device mounted below the snapping rolls and above the husking rolls. The riddle device is capable of lengthwise adjustment so that when it is desired to only have the ear of pop corn engage the husking rolls for only a short time the husking rolls may be covered by the riddle device.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a central, sectional view taken through a husking machine with my improved device installed thereon.

Fig. 2 is a top or plan view of my riddle device installed in the husking machine, the frame of the husking machine being shown in section.

Fig. 3 is a central sectional view of line 3—3 of Fig. 2.

Fig. 4 is a detail, sectional view taken on the line 4—4 of Fig. 2.

Fig. 5 is a side view of a portion of a husking machine showing how my riddle device is operated.

Fig. 6 is an enlarged sectional view taken on the line 6—6 of Fig. 1.

Fig. 7 is a detail view of a portion of the riddle device; and

Fig. 8 is a sectional view showing how the reciprocating movement is imparted to the riddle device.

In the accompanying drawings I have used the reference character A to indicate generally a husking machine which is provided with a frame work or casing 10.

The husking machine A is provided with a shelf or platform 11 on which stalks of corn 12 are placed.

A main drive shaft 13 is provided on which is the pulley wheel 14, which is connected to a pulley wheel 15 on the shaft 16 by means of the belt 17.

A shredder device 18 is mounted on the main drive shaft 13. Snapping rolls 19 are mounted forwardly on the shredder device 18 and one of the snapping rolls on the shaft 20.

The shaft 20 is driven from a gear on the shaft 13 in mesh with the gear 21; the two snapping rolls are operatively connected by gears.

Husking rolls 22 are provided and are operatively driven from the shaft 16. A conveyer device 23 is mounted below the husking rolls. Blower members 24 and 25 are mounted in the machine A and are of the ordinary construction.

My device consists of a riddle device B which has a member 27 and is provided with a series of channel shaped portions 26, as shown in Fig. 6 of the drawings.

A second member 28 similar in cross section to the member 27 is snugly received below the member 27. Grooves 29 are formed in the sides of the member 27 and receive the flange 30 of the member 28, the purpose of which will be hereafter more fully described.

Extending outwardly from the member 27 at each of its corners are the guide pins 31, which are received within the slots 32 of the frame 10.

A crank shaft 33 is journaled in the frame 10 and provided with a pulley wheel 34 which is connected to the drive pulley 14 by means of the belt 17.

The riddle device B is provided with a pair of ears 35 in which is pivoted one end of a link 36 the other end of the link 36 being mounted on the crank shaft 33.

From the construction of the parts just described it will be seen that rotation of the crank shaft 33 will impart a sliding or reciprocating movement to the riddle device B within the slots 32.

It will be understood that it is desirable to receive the ears of pop corn which are snapped by the snapping rolls 19 from the stalk and conveyed to the husking rolls under force.

It will be understood that my riddle device is so placed below the snapping rolls and above the husking rolls that when the ear of pop corn is received upon the riddle device the reciprocating movement thereof will cause the ear of corn to be thrown or forcefully moved on to the husking rolls 22.

In order to prevent the sticking or undesired movement of the ears of pop corn on the riddle device B I have provided that the bottom of each of the channel shaped members 26 have an upwardly extending projection 37 which is designed to engage one end of the ear of corn and prevent it from moving in a rearward direction, but permitting forward and downward movement of the pop corn ears.

A hinged apron member 38 hinged on the pin 39 which is mounted in the frame 10 is placed with its lower end above the rear end of the riddle device B. The frame 10 is provided with curved slots 40 through which are extended the threaded pins 41, which are fixed to the side flanges 42 of the apron member 38.

Wing nuts 43 are provided on the threaded pins 41 whereby the apron member 38 may be swung on its pivot to any desired position within the slot 40, and locked in that position by the tightening of the wing nuts 43.

An apron member 44 is fixed to the frame 10, one end thereof extending over the upper end of the apron 38, the hinging of the apron 38 permits access into the mechanism which drives the husking rolls 22 and also makes it possible to regulate the space or distance that the lower end of the apron 38 is above the riddle device B.

When the apron 38 is in its raised position the ear of pop corn when it passes from the end of the apron 38 will be delivered or received farther down on the riddle device B.

The members 27 and 28 of the riddle device B are capable of movement relative to each other.

A flange 45 on the member 28 which has a bolt 46 therein registers with a slot 47 in the sides of the member 27.

In the construction of the parts just described it will be seen that by loosening the bolts 46 I am able to slide the member 28 on the member 27 to various positions, thereby lengthening or shortening the riddle device B, as desired.

The flange 30 being received within the groove 29 holds the member 27 on to the member 28 while the bolt 46 will lock the members against movement relative to each other.

The adjustability of the riddle device B makes it possible for me to regulate the distance which the ear of pop corn contacts with the husking rolls 22.

Filler blocks 48 are provided between each set of husking rolls 22. The husking rolls 22 rotate in the direction indicated by the arrow 49.

In the practical operation of my device the stalks of corn 12 are fed through the snapping rolls 19, the stalk passes between the rolls and comes in contact with the shredder 18 which cuts the stalk into fine pieces. The cut stalk then drops on to a pan which is provided with a series of openings.

The blower 24 blows the small shredded or cut stalk, while any kernels of corn which by any chance may drop off of the ears of pop corn will pass through the openings in the pan into a suitable container.

The blower 25 then places the stalk in the place desired.

It will be understood however that the chances of any kernels of corn from coming off of the ear are very slight. As the ear drops over the apron 38 and on to the riddle device B point downward it is straightened out by means of the channel shaped portions 26. The rear end of the ear engages the projections 37 and thus any rearward movement during the reciprocation of the riddle device B is prevented.

As the riddle device B is reciprocated the ear of pop corn is forced or thrown therefrom on to the husking rolls. The husking rolls which are of the ordinary construction, then strips the husks from the pop corn.

In many cases when the pop corn is more matured and it is easier to remove the husks therefrom, then the riddle device may be lengthened so that the corn will not engage the husking rolls to any excessive amount.

It will be understood that the less an ear of pop corn is bruised the better it will be. With my adjustable riddle device I am able to regulate the amount of time that the ear of pop corn will contact with the husking rolls, thus reducing any possibility of over-bruising to a minimum.

The riddle device serves as a guide for the pop corn, serves as a deliverer and a means for forcing the ear on to the husking rolls, and at the same time makes it possible to adjust the length of time that the ears of pop corn contact with the husking rolls.

One of the great advantages of my device is that I am able to deliver the soft, small ears of pop corn on to the rolls in such position that the husks will be stripped therefrom without the danger of the small tender ears of pop corn being crushed between the husking rolls.

Some changes may be made in the construction, combination and arrangement of the various parts of my device, without departing from the essential features and purposes of my invention, and it is my intention to cover by my claims any modified forms of structure or use of mechanical equivalents which may be reasonably included within their scope.

I claim as my invention:

1. In combination with a husking machine having snapping rolls, husking rolls and means for operating said rolls, a riddle or chute device having a pair of members capable of sliding longitudinally relative to each other for lengthwise adjustment, one of said members being provided with channel shaped portions and raised projections at the bottom of said channel shaped portions, the other of said members being provided with corresponding channel shaped portions.

2. In combination with a husking machine having snapping rolls, husking rolls and means for operating said rolls, a riddle or chute device mounted above said husking rolls and substantially parallel therewith, said riddle device being formed of sections or parts capable of lengthwise adjustment whereby the parts may be so arranged that the length of husking surface may be varied as desired and means for locking said parts in their adjusted positions.

3. In combination with a husking machine having snapping rolls, husking rolls and means for operating said rolls, a riddle or chute device having channel shaped portions therein and raised projections at the bottom of said channel shaped portion, an apron device pivotally mounted below the snapping rolls, whereby ears of corn from the snapping rolls will be delivered on to said riddle device, the parts being so arranged that the ears of corn when received on the husking rolls are in position substantially parallel therewith and received under force.

JOHN H. SISSEL.